United States Patent
Wang et al.

(10) Patent No.: US 6,906,993 B2
(45) Date of Patent: Jun. 14, 2005

(54) HYBRID OPTICAL DISC HAVING DEPTHS OF PITS AS FUNCTION OF WAVELENGTH & PRE-PITS WIDTH WHICH ARE FUNCTION OF TRACK PITCH WITHIN CERTAIN RANGE

(75) Inventors: Shyh-Yeu Wang, Hsinchu Hsien (TW); Min-Chung Chiu, Hsinchu Hsien (TW); Chi-Tsung Hsu, Hsinchu Hsien (TW)

(73) Assignee: Ritek Corporation, Hsinchu Hsien (TW)

( * ) Notice: Subject to any disclaimer, the term of this patent is extended or adjusted under 35 U.S.C. 154(b) by 313 days.

(21) Appl. No.: 10/170,450

(22) Filed: Jun. 14, 2002

(65) Prior Publication Data

US 2003/0007447 A1 Jan. 9, 2003

(30) Foreign Application Priority Data

Jun. 15, 2001 (TW) ........................................ 90114596 A

(51) Int. Cl.$^7$ ................................................ G11B 7/00
(52) U.S. Cl. .................................... 369/275.3; 369/47.1
(58) Field of Search .............................. 369/275.3, 47.1

(56) References Cited

U.S. PATENT DOCUMENTS

| | | | |
|---|---|---|---|
| 5,316,814 A | | 5/1994 | Sawada et al. |
| 5,696,758 A | | 12/1997 | Yanagimachi et al. |
| 5,757,746 A | * | 5/1998 | Matsui .................... 369/44.28 |
| 5,763,037 A | * | 6/1998 | Ohtomo et al. ............ 428/64.1 |
| 6,115,353 A | * | 9/2000 | Horie et al. ............. 369/275.4 |
| 6,212,158 B1 | | 4/2001 | Ha et al. |
| 6,243,352 B1 | * | 6/2001 | Kanno et al. ............ 369/275.1 |
| 6,264,848 B1 | * | 7/2001 | Belser et al. ................. 216/22 |
| 6,418,111 B1 | * | 7/2002 | Takemura et al. ....... 369/275.3 |
| 6,438,098 B1 | * | 8/2002 | Nakajima et al. ........ 369/275.4 |
| 6,459,661 B1 | * | 10/2002 | Iwanaga .................. 369/44.26 |
| 6,510,129 B1 | * | 1/2003 | Hirokane et al. ........ 369/275.4 |
| 6,633,534 B1 | * | 10/2003 | Tosaki et al. ............ 369/275.3 |

FOREIGN PATENT DOCUMENTS

JP    09106577 A  *  4/1997  ............ G11B/7/24

\* cited by examiner

*Primary Examiner*—Gautam R. Patel
(74) *Attorney, Agent, or Firm*—Birch, Stewart, Kolasch & Birch, LLP

(57) ABSTRACT

A hybrid optical disc recording medium has concurrently a hybrid read-only area and a rewritable area on an optical substrate. The substrate of the read-only area has pre-pits, and the substrate of the rewritable area has pre-grooves. The pre-pits and the pre-grooves have the same depth. Thus when making the stampers for producing the hybrid optical disc, the technical problems of difficult to control the yields that incur to conventional techniques of different depths of the pits and the grooves can be effectively resolved. Experiments and test results indicate that the hybrid optical disc recording medium of the invention that have the same depth for the pits and the grooves, and extended grooves, can generate signals to meet the standards of the specifications.

11 Claims, 4 Drawing Sheets

(A)

(B)

HYBRID OPTICAL DISC HAVING DEPTHS OF PITS AS FUNCTION OF WAVELENGTH & PRE-PITS WIDTH WHICH ARE FUNCTION OF TRACK PITCH WITHIN CERTAIN RANGE

FIELD OF THE INVENTION

The invention relates to a hybrid optical disc recording medium and particularly to a hybrid optical disc recording medium that has a read-only area and a rewritable area.

BACKGROUND OF THE INVENTION

Optical disc recording media are generally for recording data. The recorded data on the optical disc may be read and retrieved by commercial optical disk drives. Conventional recordable optical discs are formed by a substrate and have their surfaces coated sequentially with a dielectric layer, a recording layer, and a reflective layer, and finally are covered by a protective overcoat.

The recording materials used by the recording media mentioned above usually include Ag—In—Sb—Te, In—Sb—Te, or Ge—In—Sb—Te. The media thus made generally are called CD-RW and are available on the market, Records on flee CD-RW generally are formed by irradiating a high power semiconductor laser of the wavelength about 780 nm. A portion of the recording layer materials being irradiated are transformed from the crystallized region to the amorphous region and result in a reliable burning effect. As the crystallized region and the amorphous region have different reflectance, signals burned on the CD-RW may be read sequentially by a lower power laser beam. The substrate of the CD-RW set forth above has wobble grooves, The frequency of the wobble grooves contains Absolute Time In Pre-groove (ATMP). The noise-signal ratio of the wobble grooves is above 36 dB before burning, and above 26 dB after burning.

In contrast, conventional CD and CD-ROM discs do not have any recording layer. All of the data are engraved in advance on stampers. Then an injection principle is employed to replicate the pits on the substrate. The substrate is plated with a reflective layer to complete the CD or CDROM disc. The information formed by the pits are read to control the rotation speed of the disc and obtain time signals. The signals formed by the pits no longer contain wobble information.

Recently there are patents suggesting to make hybrid discs to combine the read-only area formed by pits and the rewritable area formed by grooves. Such discs are generally called Hybrid Discs in the Orange Book. For the hybrid discs, one of the critical techniques is to make the electric signals regenerated from the read-only area and the rewritable area to meet the standards of the Orange Book. However on the hybrid discs designed by directly adopting the conventional technical specifications of CD or CD-RW, the electric signals regenerated from the read-only area and the rewritable area are difficult to simultaneously meet the standards of the Orange Book.

In the presently known hybrid discs, the composition of the read-only area and the rewritable area differs greatly from the conventional CD or CD-RW. For instances, U.S. Pat. Nos. 5,316,814, 5,696,758, 6,115,353 and 6,212,158 disclose various types of techniques for making the hybrid disc. They directly adopt the pre-pit and pre-groove specifications of the conventional CD and CD-RW. The differences are:

1. In order to simplify manufacturing processes, the layers being plated on die read-only area and the rewritable area on the hybrid disc must be the same. However, the read-only area of the conventional disc requires only one plated reflective layer. In contrast, the read-only area and the rewritable area on the hybrid disc must be plated with a dielectric layer, a recording layer, a reflective layer, etc. to form a laminated structure.

2. In the known hybrid discs, tile pre-pit of the read-only area and the pre-groove of the rewritable area have different depths. The depth of the pits of the conventional CD-ROM usually ranges from 80 nm to 160 nm. Only signals of high frequency modulation can reach this standard. However the depth of the grooves of the conventional CD-RW is smaller, and usually ranges from 30 nm to 80 nm. The width of half-depth groove generally ranges from 400 nm to 800 nm. Based on the groove reflective index of the CD-RW of these specifications, only high frequency modulated signals can reach the Orange Book standards. In the presently known hybrid discs, as the depths of the pre-pit in the read-only area and the pre-groove in the rewritable area are directly adopted the conventional CD and CD-RW specifications, engraving the grooves on the stamper is very difficult.

3. The known hybrid discs require the frequency of the wobble grooves to carry ATIP to link the read-only area and the rewritable area, hence the pits in the read-only area also contain wobble signals. Therefore both the read-only area and the rewritable area must conform to the Orange Book standards (WCNRa), Making the stamper for a conventional hybrid disc, as shown in FIG. 1(A) generally includes forming a photoresist film 11 at a thickness ranged from 30 nm to 160 nm on a glass substrate 10; then as shown in FIG. 1(B), employing a laser beam to cut the photoresist film 11 to form pits 12 with the bottom ends reaching the surface of the glass substrate 10. The maximum depth of the pits 12 is the thickness of the photoresist layer 11. Thus to cut and form the pits 12 with the required depth does not need to control the energy of the laser beam.

However, cutting the grooves 13 is different. In order to meet the Orange Book standards, in the presently known products that adopt the groove depth of the conventional CD-ROM, to cut the groove with the depth between 30 nM and 80 nm requires strict control of laser beam energy. Taking the median value of 55 nm as the basis, the upper and the lower allowance is merely 25 nm. With so small of tolerance, production yield is very low. Moreover, there is still a distance between the bottom end of the groove 13 and the surface of the glass substrate 10, and the bottom end of the groove is pointed because of We characteristics of the laser beam. The pointed bottom end of the groove results in not desirable signal regeneration and burning.

After having fished the manufacturing processes set forth above, the back surface of the finished product is plated with silver or nickel to form the master disc. The master disc then is polished on the back surface and cut to form the stamper for producing the hybrid optical discs.

For the engraving machines now available, to engrave the pits and the grooves of two different depths and widths on the same photoresist film is very difficult. As a result, production cost for such type of stamper is very high and control of the yield is very difficult. Therefore it is critical to develop an improved hybrid optical disc.

SUMMARY OF THE INVENTION

In view of the aforesaid disadvantages of the difficulty to precisely engrave two different depths and widths for the pits and the grooves on the photoresist film that incurs to the conventional manufacturing processes that employing the stamper to make the hybrid optical discs, the object of the invention is to provide a hybrid optical disc recording medium that has the same depth for the pits and the grooves.

The hybrid optical disc recording medium according to the invention has pre-pits in the read-only area with a depth ranging from 1/10 to 1/5 of the wavelength and a width ranging from 1/4 to 1/2 of the track pitch. In the rewritable area, the pre-grooves have a depth ranging from 1/10 to 1/5 of the wavelength and a width ranging from 1/2 to 7/8 of the track pitch.

Experiments prove that electric signals regenerated in the read-only area and the rewritable area of the hybrid optical disc recording medium according to the invention all meet the standards of the specifications.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 2:
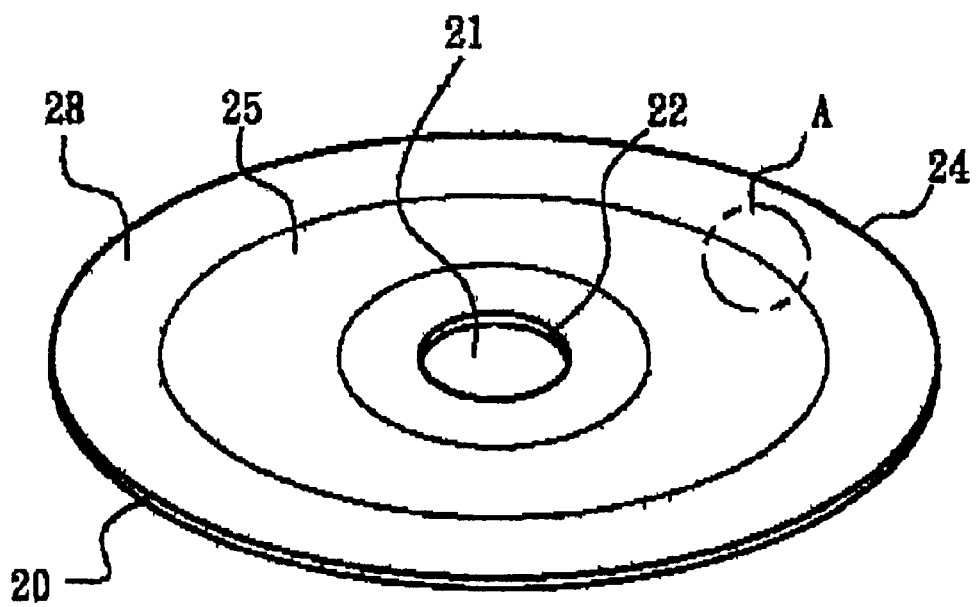
FIG. 2 is a perspective view of an embodiment of the hybrid optical disc medium according to the invention.

Referring to FIG. 2 for a hybrid optical disc medium according to the invention, an optical disc substrate 20 with wobble grooves formed thereon has a center opening 21. There is an inner perimeter 22 around the center opening 21 and an outer perimeter 24. A read-only area 25 and a rewritable area 28 are formed on the optical disc between the inner perimeter 22 and the outer perimeter 24. The relative locations of the read-only area 25 and the rewritable area 28 may be formed in fashions other than the ones shown in FIG. 2. For instances, their locations may be switched or mixed alternately without affecting the implementation of the invention.

Figure 3:
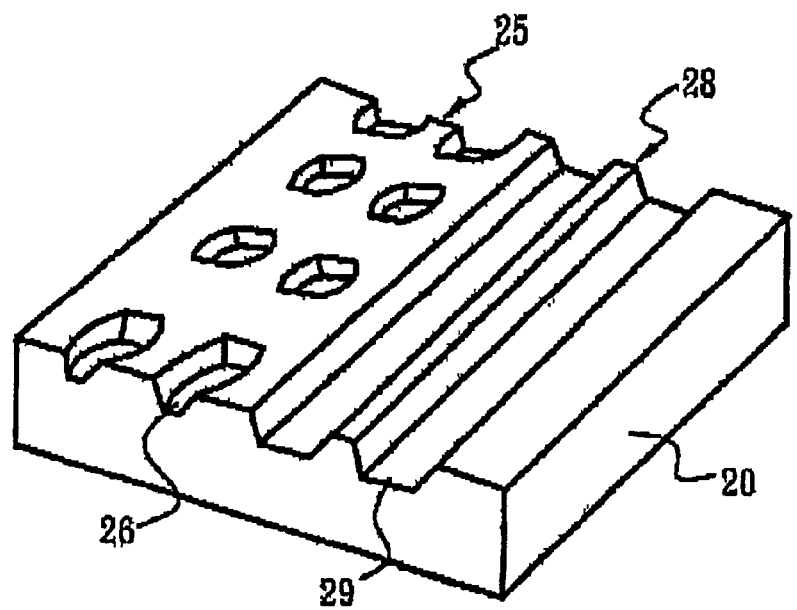
FIG. 3 is an enlarged fragmentary perspective view of A portion shown in FIG. 2, the pits in the read-only area and the grooves in the rewritable area have the same depth. (Thus, according to the embodiment of the invention, there is no control difficulty for the etching depth of the photoresist film before the master mold is made).

Refer to FIG. 3 for an enlarged view of a portion of the read-only area 25 and the adjacent rewritable area 28 shown in FIG. 2 (for A portion in FIG. 2). The read-only area 25 has pre-pits 26 while the rewritable area 28 has pre-grooves 29 with the same depth as that of the pre-pits 26.

Figure 4:
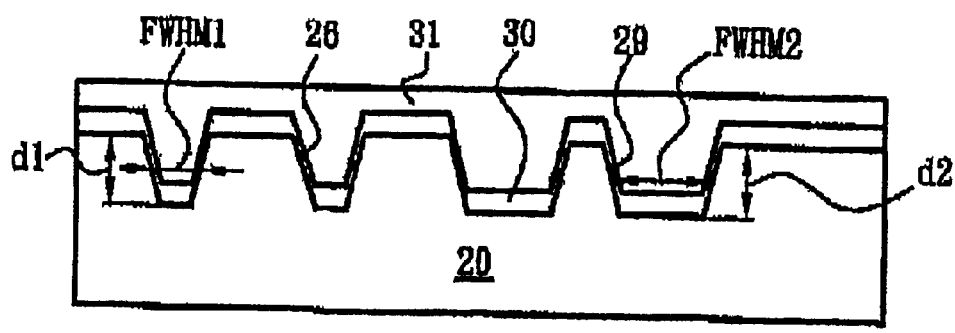
FIG. 4 is a fragmentary cross section of the hybrid optical disc medium according to an embodiment of the invention.

Refer to FIG. 4 for the cross section of the read-only area 25 and the rewritable area 28 shown in FIG. 3. On the formed optical disc substrate 20, form a laminated structure 30, then cover the laminated structure with a protective overcoat 31. The laminated structure 30 includes a lower dielectric layer, a recording layer, an upper dielectric layer and a reflective layer formed in this order on the optical disc substrate 20.

Figure 1:
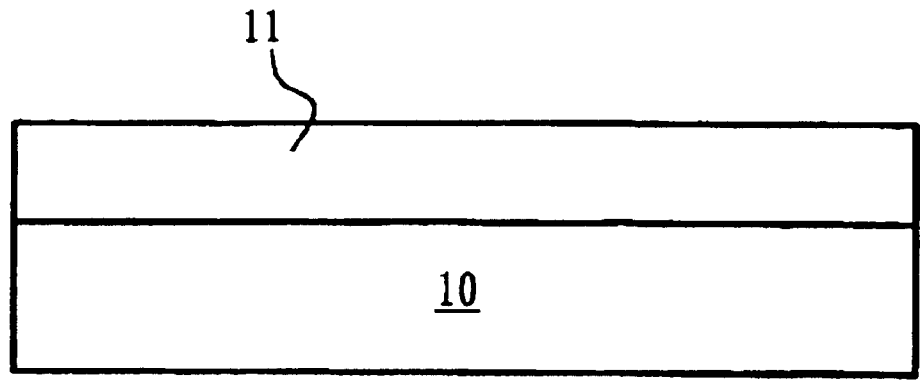
FIG. 1(A) is a cross section of a glass substrate for a conventional hybrid optical disc before making the master mold, with a photoresist film formed thereon.
FIG. 1(B) is a cross section of a glass substrate for a conventional hybrid optical disc with the photoresist film etched to form pits in the read-only area and the grooves in the rewritable area. The depths of the grooves do not reach the glass substrate, thus result in difficult control of the cutting depth by the laser, and pointed bottom ends.
Figure 1:
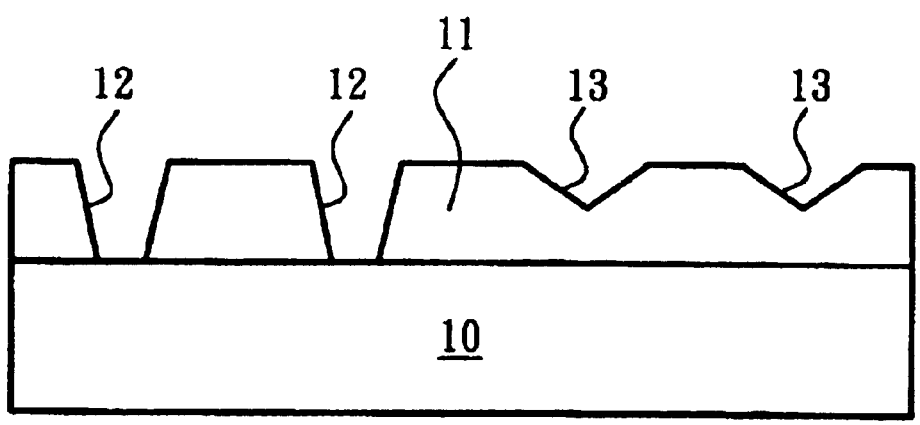

As shown in FIG. 4, the pre-pits 26 have the depth d1 and the pre-grooves 29 have the depth d2 in a range between 1/10 and 1/5 of the wavelength (or from 80 nm to 160 nm), preferably between 1/10 and 3/20 of the wavelength (or from 80 nm to 120 nm). According to the invention, d1 and d2 may be the same. Hence when making the stamper, the laser beam may directly irradiate through the photoresist film 11 (referring to FIG. 1 for making of the stamper) to process cutting operation and effectively resolve the problems incurred to the conventional products.

The width FWHM1 of the pre-pits 26 may be in the range between 3/16 and 1/2 of the track pitch (or from 300 nm to 800 nm), and the width FWHM2 of the pre-groves 29 may be in the range between 1/2 and 7/8 of the track pitch (or from 800 nm to 1400 nm).

Preferably, the width FWHM1 is in the range between 1/4 and 7/16 of the track pitch (or from 400 nm to 700 nm), and the width FWHM2 is in the range between 9/16 and 3/4 of the track pitch (or from 900 nm to 1200 nm).

Referring to FIG. 3, the pre-pits 26 formed in the read-only area 25 are individual ones without connecting to one another. Test results indicate that the pre-pits 26 still generate wobble signals during the reading operation of the optical disc drive. On the other hand, the rewritable area 28 still has wobble pre-grooves.

Figure 5:
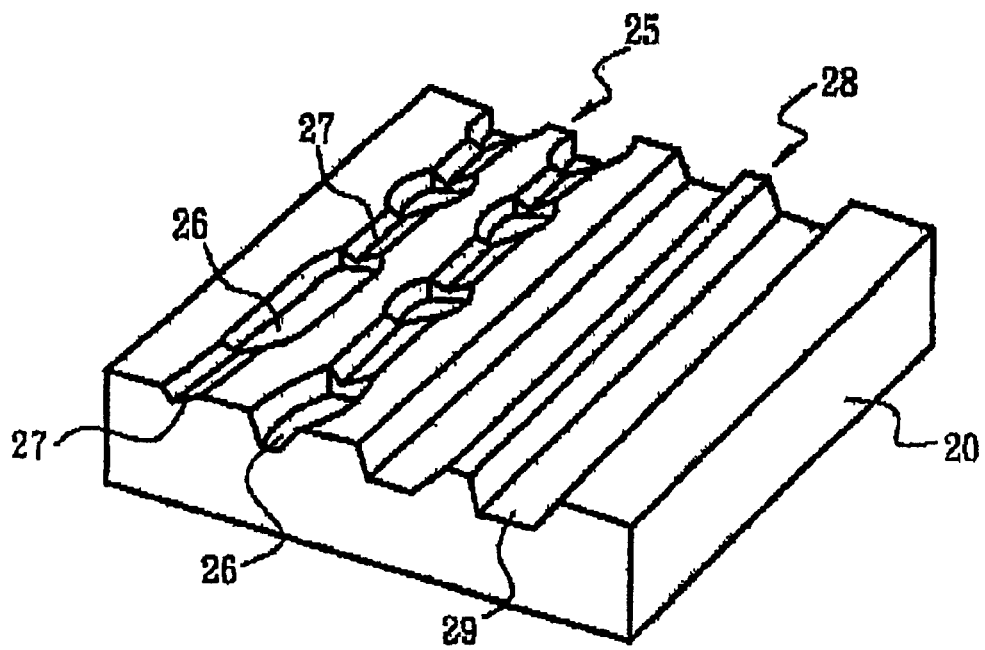
FIG. 5 is an enlarged fragmentary perspective view of other embodiment of the hybrid optical disc medium according to the invention, showing the pits in the read-only area are connected by additional connecting grooves.
Figure 6:
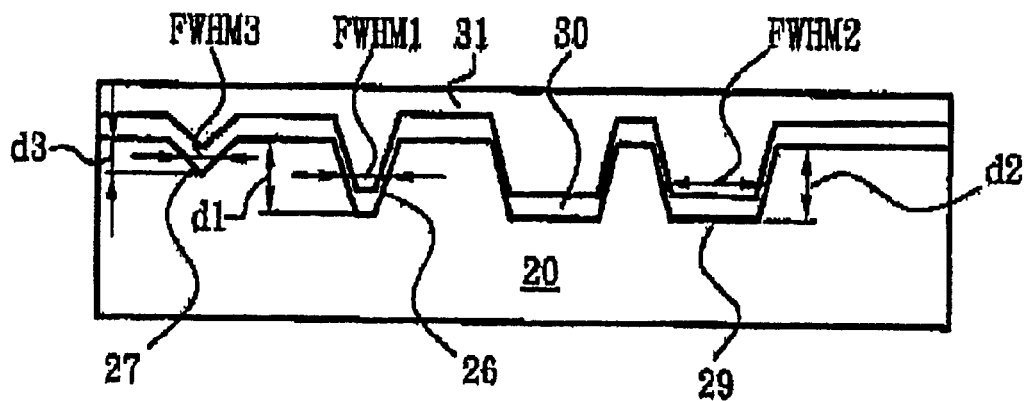
FIG. 6 is a fragmentary cross section of the hybrid optical disc medium according to the other embodiment shown in FIG. 5.

Refer to FIGS. 5 and 6 for the other embodiment of the invention. In this embodiment, the pre-pits 26 in the read-only area are connected by grooves 27 of a smaller depth. Experiments results indicate that the depth d3 should be controlled to less than 40 nm, and the width FWHM3 of the connecting grooves 27 may be equal to or smaller than the width FWHM1 of the pre-pits 26.

Test results of the embodiments:

EXAMPLE 1

The actual example being made for the hybrid optical disc medium:

A substrate is made by injection molding and has the radius of 120 mm, the thickness of 1.2 mm and the reflective index 1.58. There are wobble grooves formed on the substrate with the track pitch of 1.6 nm between the centers of a pair of adjacent tracks. The depth of the pits and the grooves in the read-only area is 100 nm. The width of half depth of tile pits in the read-only area is 600 nm, while the width of half depth of the grooves in the rewritable area is 800 nm. The diameter of the whole rewritable area is in the range between 60 and 118 mm.

The laminated layers is made by commercial sputtering machines. The operation vacuum is $7.0 \times 10^{-3}$ mbar and is filled with argon gas during sputtering. The laminated layer structure formed on the substrate includes, sequentially, a lower dielectric layer, a recording layer, an upper dielectric layer, and a reflective layer, and finally a protective overcoat. The material of the dielectric layers is the alloy of ZnS—SiO2 and is coated with the sputtering power of 3 kW. The material of the recording layer is the alloy of Ag—In—Sb—Te and is coated with the sputtering power of 0.5 kW. The material of the reflective layer is Al-alloy and is coated with the sputtering power of 6 kW. The material of the protective overcoat is a resin curable by ultraviolet light and laid on the reflective layer by spin coating, and is formed by exposing through an ultraviolet light exposing machine. Finally, the disc is initialized by means of an initializer.

(Testing of the Hybrid Optical Disc Recording Medium)

EFM signals are written on the rewritable area of the hybrid optical disc recording medium by means of a commercial burner (YAHAMA 8824S). Then a CD-CATS testing machine is used to test signals in die read-only area and the written rewritable area. Test items include the error rate (BLER), high frequency modulation rate ($I_{11}/Itop$), reflectance, push-pull, jitter, and average wobble amplitude (NWA). The test values of the parameters set forth above are shown in Table 1 below.

EXAMPLE 2

Methods of making and testing the disc are same as the ones of the example 1. The pre-pits in the read-only area also are not connected by connecting grooves. However, the depth of the pits is changed to 80 nm, and the width of the half-depth groove in the rewritable area is 900 nm. The finished disc thus made is written and read by means of the same optical disc burner.

EXAMPLE 3

Methods of making and testing the disc are same as the ones of the example 1. However, the depth of the pits is changed to 120 nm, and the width of the half-depth groove in the rewritable area is 1200 nm. The pits in the read-only area are connected by connecting grooves which have a depth of 30 nm. The finished disc thus made is written and read means of the same optical disc burner.

EXAMPLE 4

Methods of making and testing the disc are same as the ones of the example 1. The pre-pits in the read-only area also are not connected by connecting grooves. However, the depth of the pits is changed to 160 nm, and the width of the half-depth groove in the rewritable area is 1400 nm. The finished disc thus made is written and read by means of the same optical disc burner.

EXAMPLE 5 (A COMPARING EXAMPLE)

Methods of making and testing the disc are same as the ones of the example 1, however the half-depth groove in the rewritable area decreases to 600 nm.

Actual test conditions and results are shown in Table 1 and Table 2 below:

TABLE 1

Tests for the read-only area (ROM)

|  | d1 (nm) | FWHM1 (nm) | d2 (nm) | FWHM2 (nm) | Wobble amplitude (nm) | REF | $I_{11}/Itop$ | BLER | Jitter | PP | NWA | SYM |
|---|---|---|---|---|---|---|---|---|---|---|---|---|
| Example 1 | 100 | 600 | 0 | 0 | 40 | 22 | 0.68 | 2.0 | 30 | 0.12 | 0.050 | −10 |
| Example 2 | 80 | 600 | 0 | 0 | 40 | 25.6 | 0.52 | 47.3 | 24 | 0.07 | 0.050 | −6.8 |
| Example 3 | 120 | 600 | 30 | 200 | 40 | 23.4 | 0.76 | 10.0 | 32 | 0.06 | 0.050 | −3.5 |
| Example 4 | 160 | 600 | 0 | 800 | 40 | 20.2 | 0.80 | 3.0 | 30 | 0.14 | 0.05 | −8 |
| Example 5 | 100 | 600 | 0 | 0 | 40 | 22 | 0.68 | 2.0 | 30 | 0.12 | 0.050 | −10 |

Remarks: d1: Depth of the pits; d2: Depth of the connecting grooves; FWHM1: Width of the pits; FWHM2: Width of the connecting grooves

TABLE 2

Tests for the rewritable area (RAM)

|  | d3 (nm) | FWHM3 (nm) | Wobble amplitude (nm) | REF | $I_{11}/Itop$ | BLER | Jitter | PP | NWA | SYM |
|---|---|---|---|---|---|---|---|---|---|---|
| Example 1 | 100 | 800 | 40 | 16.2 | 0.74 | 2.0 | 31 | 0.08 | 0.050 | −6.4 |
| Example 2 | 80 | 900 | 40 | 19.0 | 0.77 | 2.6 | 28 | 0.14 | 0.050 | −7.1 |
| Example 3 | 120 | 1200 | 40 | 18.4 | 0.76 | 15.0 | 32 | 0.10 | 0.050 | −7 |
| Example 4 | 160 | 1400 | 40 | 16.0 | 0.72 | 10.0 | 32 | 0.065 | 0.050 | −7 |
| Example 5 | 100 | 600 | 40 | x | x | x | x | x | x | x |

Remarks: d3: Depth of the grooves; FWHM3: Width of the grooves; x: indicates not burnable, hence no testing data.

TABLE 3

Related standards in the Orange Book

| REF | I11/Itop | BLER | Jitter | PP | NWA | SYM |
|---|---|---|---|---|---|---|
| 15~25 | ~0.55 | 220~ | 35~ | 0.08~0.12 | 0.035~0.06 | −15 + 5 |

Test results in the above tables indicate that, except for the example 5, for those examples that have the same depth of grooves and pits, all of the regenerated electric signals meet the specifications of the Orange Book. Only example 5 fails. It is caused by the width of the half-depth pre-grooves being only 600 nm and resulting in too low of reflectance. As a result, it could not be written by the commercial burner.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A hybrid optical disc recording medium made from a substrate and laid sequentially on the substrate a dielectric layer, a recording layer, a reflective layer, and a protective overcoat, comprising:
   a read-only area having a plurality of independent pits with a same depth but of different lengths for generating electric signals when read by machines; and
   a rewritable area having grooves which have a depth same as that of the pits in the read-only area, the grooves having a bottom which is flat in a middle portion thereof;
   wherein the depth of pits ranges from $1/10$ wavelength to $1/5$ wavelength, and the pits have a pre-pits width ranging from $3/16$ track pitch to $1/2$ track pitch;
   wherein the depth of the grooves ranges from $1/10$ wavelength to $1/5$ wavelength, and the grooves have a width ranging from $1/2$ track pitch to $7/8$ track pitch.

2. The hybrid optical disc recording medium of claim 1, wherein the depth of pits range from $1/10$ wavelength to $3/20$ wavelength.

3. The hybrid optical disc recording medium of claim 1, wherein the width (FWHM1) of the pits ranges from $1/4$ track pitch to $7/16$ track pitch.

4. The hybrid optical disc recording medium of claim 1, wherein the depth of the grooves ranges from $1/10$ wavelength to $3/20$ wavelength.

5. The hybrid optical disc recording medium of claim 1, wherein the width (FWHM2) of the grooves ranges from $9/16$ track pitch to $3/4$ track pitch.

6. The hybrid optical disc recording medium of claim 1, wherein the depth of the pits ranges from 80 nm to 160 nm, and the pits having a width ranging from 300 um to 800 nm.

7. The hybrid optical disc recording medium of claim 6, wherein the depth of the pits ranges from 80 nm to 120 nm.

8. The hybrid optical disc recording medium of claim 6, wherein the width of the pits ranges from 400 nm to 700 nm.

9. The hybrid optical disc recording medium of claim 1, wherein the depth of the groove ranges from 80 nm to 160 nm, and the grooves having a width ranging from 800 nm to 1400 nm.

10. The hybrid optical disc recording medium of claim 9, wherein the depth of the groove ranges from 80 nm to 120 nm.

11. The hybrid optical disc recording medium of claim 9, wherein the width of the grooves ranges from 900 nm to 1200 nm.

* * * * *